US012400622B2

(12) United States Patent
Powers

(10) Patent No.: US 12,400,622 B2
(45) **Date of Patent: *Aug. 26, 2025**

(54) SADDLE AND BRIDGE FOR REDUCING LONGITUDINAL WAVES IN A STRING INSTRUMENT

(71) Applicant: TAYLOR-LISTUG, INC., El Cajon, CA (US)

(72) Inventor: Andrew Taylor Powers, Carlsbad, CA (US)

(73) Assignee: TAYLOR-LISTUG, INC, El Cajon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,586

(22) Filed: Dec. 6, 2023

(65) Prior Publication Data

US 2024/0105147 A1 Mar. 28, 2024

Related U.S. Application Data

(63) Continuation of application No. 16/737,260, filed on Jan. 8, 2020, now Pat. No. 12,062,353.

(60) Provisional application No. 62/876,217, filed on Jul. 19, 2019.

(51) Int. Cl.

*G10D 3/13* (2020.01)
*G10D 3/04* (2020.01)
*G10D 3/06* (2020.01)

(52) U.S. Cl.

CPC ................. *G10D 3/13* (2020.02); *G10D 3/04* (2013.01); *G10D 3/06* (2013.01)

(58) Field of Classification Search

CPC ............... G10D 3/13; G10D 3/04; G10D 3/06

See application file for complete search history.

(56) References Cited

U.S. PATENT DOCUMENTS 3,523,480 A 8/1970 Conklin, Jr.
3,538,233 A 11/1970 Stanley
3,951,031 A 4/1976 Barcus et al.
4,314,495 A * 2/1982 Baggs .................... G10H 3/185 84/DIG. 24
4,852,450 A 8/1989 Novak
5,410,101 A * 4/1995 Sakurai .................. G10H 3/185 84/DIG. 24
5,455,381 A 10/1995 Juszkiewicz et al.

(Continued)

FOREIGN PATENT DOCUMENTS

CN 106847234 A 6/2017
CN 209070962 U 7/2019

(Continued)

OTHER PUBLICATIONS

International Search Report/Written Opinion issued to PCT/US2020/043006 on Oct. 21, 2020.

(Continued)

*Primary Examiner* — Jianchun Qin

(74) *Attorney, Agent, or Firm* — Patterson + Sheridan, LLP

(57) ABSTRACT

A saddle for a string instrument includes a string contact surface comprising a first material, a saddle end surface, generally opposite the string contact surface, comprising the first material, and two opposing side surfaces comprising a vibration-absorbent material different than the first material.

20 Claims, 11 Drawing Sheets

(56) References Cited

U.S. PATENT DOCUMENTS

| | | | |
|---|---|---|---|
| 5,874,658 A | 2/1999 | Belter | |
| 5,986,190 A | 11/1999 | Wolff et al. | |
| 6,166,309 A | 12/2000 | Hoshino | |
| 7,838,752 B2 | 11/2010 | LaMarra | |
| 8,921,675 B2 | 12/2014 | Gimpel et al. | |
| 8,969,702 B2 * | 3/2015 | Takabayashi .......... | G10H 3/185 84/723 |
| 9,792,886 B2 | 10/2017 | Lyles | |
| 2008/0034941 A1 | 2/2008 | Marvin | |
| 2009/0205477 A1 | 8/2009 | Stadler | |
| 2012/0234155 A1 | 9/2012 | Finkle | |
| 2013/0160634 A1 | 6/2013 | Hosler | |

FOREIGN PATENT DOCUMENTS

| | | | |
|---|---|---|---|
| EP | 2196987 | A1 | 6/2010 |
| FR | 708363 | A | 7/1931 |
| GB | 999820 | A | 7/1965 |
| JP | S60125686 | A | 7/1985 |
| JP | 2002182640 | A | 6/2002 |
| JP | 2004361975 | A | 12/2004 |
| JP | 2007033806 | A | 2/2007 |
| JP | 2009186980 | A | 8/2009 |
| KR | 20130072650 | A | 7/2013 |
| WO | 2005111991 | A1 | 11/2005 |

OTHER PUBLICATIONS

Japanese Office Action issued to patent application No. 2022-503552 on May 31, 2024.

Indonesian Office Action issued to patent application No. P00202200446 on Aug. 15, 2024.

China Office Action issued to patent application No. 202080047626.1 on Jan. 21, 2025.

China Office Action issued to patent application No. 202080047626.1 on Jun. 18, 2025.

* cited by examiner

SADDLE AND BRIDGE FOR REDUCING LONGITUDINAL WAVES IN A STRING INSTRUMENT

CROSS-REFERENCE TO RELATED APPLICATIONS

This application is a continuation of co-pending U.S. patent application Ser. No. 16/737,260, filed Jan. 8, 2020, which claims the benefit of U.S. Provisional Patent Application 62/876,217, filed Jul. 19, 2019, the contents of each of which are incorporated herein by reference in their entirety.

BACKGROUND

Field

Embodiments of the present disclosure generally relate to configuration and construction of components of a string instrument. More particularly, the disclosure relates to a saddle and a bridge for reducing longitudinal waves in a string instrument.

Description of the Related Art

A string instrument (sometimes referred to as a stringed instrument) such as a guitar is generally comprised of a solid or hollow resonant body commonly made from one or more woods, or similar material. Attached to this main instrument body is a slender extension commonly referred to as a neck, to which are attached a plurality of strings anchored with adjustable pegs used to control the tension of the strings. The distal end of the strings is attached to a bridge where vibration of the strings is transferred to the body of the instrument in order to amplify the vibration of the strings and make the vibration audible.

The vibrating length of strings is determined by two fixed points of contact perpendicular to the length of the strings, one point near the adjustable anchoring pegs, and one point on the bridge. The strings are stretched taut over these two points of contact. This point of contact on the bridge is typically a saddle comprising hard material for the strings to rest on, often made of natural bone, ivory, or a dense synthetic material and fit tightly into an elongated aperture formed in the hard wood bridge of a guitar. A musician will strum or pluck these strings to set them in motion, creating sound. The pitch of the notes played is determined by stopping the strings against the neck, altering their speaking or vibrating length and corresponding frequency.

When the string of such an instrument, like a guitar vibrates, its motion can be described as the sum of two waveforms, referred to by those familiar in the art as the transverse wave motion and the longitudinal wave motion. The transverse wave motion is characterized by movement of the vibrating string in a direction perpendicular or transverse to the axis of the string when it is at rest. The longitudinal wave motion travels parallel to the axis of the string. On a guitar or other string instrument, the transverse wave is the motion primarily responsible for the audible musical pitch. The frequency of the transverse string motion can be intentionally tuned by altering the tension of the string, as well as the active speaking length. The longitudinal wave typically travels at a higher speed and frequency than the transverse wave, and is more difficult to tune as it's pitch or frequency cannot be significantly altered by tension. It can be tuned by altering the composition of the string itself to change the material's density or flexibility, or by altering the overall length of the string.

A challenge to overcome in building a string instrument is to balance the transverse and longitudinal motions via string length, size, weight, stiffness, tension and pitch in order to prevent the two vibratory motions from causing interference with each other and corrupting the harmonic sound of the desired musical note.

When the instrument is fitted with an electromechanical pickup sensor, longitudinal wave motion is particularly significant and detrimental to musical functioning of the instrument. Piezo electric crystals are often employed in amplifying such a string instrument. These crystals are extremely sensitive to vibration and respond to vibratory motion of the saddle piece installed in the bridge. When installed in the bridge of a string instrument, an electromechanical pickup system is particularly sensitive to reception of a string's longitudinal wave motion which causes undesirable resonant frequencies and harmonic corruption of the musical frequencies imparted by the transverse wave motion.

Existing techniques for balancing longitudinal waves with transverse waves involve altering the composition and/or length of strings. One method is taught by Harold Conklin (U.S. Pat. No. 3,523,480A), where the active vibrating length of a piano string is fixed so that the transverse wave motion and longitudinal wave motion have frequencies which relate to each other in a predetermined musically pleasing harmonic relationship.

Another existing method is taught by James Ellis (U.S. Pat. No. 5,874,685A), wherein the longitudinal wave form and transverse wave form are determined by altering the string composition or articulation point from a piano hammer or harpsichord plectrum so the resonant frequency of the longitudinal wave is interfered upon by the transverse wave and cancelled out.

However, these existing techniques cannot be employed with guitars. Unlike a piano that uses one or more individual strings to play each note, a guitar is expected to play many notes on each string by altering the length of the transversely vibrating string portion as the player depresses the strings to the frets, continuously altering the relationship between the longitudinal and transverse string vibrations and preventing the use of previously taught methods. Therefore, there is a need in the art for techniques for reducing the audible effect of the longitudinal wave form in guitars and other fretted string instruments

SUMMARY

The present disclosure generally relates to a string instrument, more particularly, components of a guitar.

One embodiment provides a saddle for a string instrument, comprising: a string contact surface comprising a first material; a saddle end surface, generally opposite the string contact surface, comprising the first material; and two opposing side surfaces comprising a vibration-absorbent material different than the first material.

Another embodiment provides a guitar, comprising: a neck; a body; a top; a bridge affixed to the top, the bridge comprising a slot, the slot having a slot end surface and two side walls; and a saddle at least partially disposed within the slot, the saddle having a string contact surface, a saddle end surface generally opposite the string contact surface, and two opposing side surfaces comprising a vibration-absorbent material.

Another embodiment provides a bridge comprising a slot, the slot comprising: a slot end surface; and two side walls, wherein the two side walls comprise a vibration-absorbent material, and wherein a saddle is at least partially disposed within the slot, the saddle having a string contact surface, a saddle end surface generally opposite the string contact surface, and two opposing side surfaces in contact with the two side walls.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure relates to a saddle and a bridge for reducing longitudinal waves in a string instrument.

Embodiments of the present disclosure include a modified saddle piece that, when inserted into the bridge atop of which the strings rest on a string instrument, dampens longitudinal waves to prevent them from interfering with the desirable transverse wave motion. Alternative embodiments of the present disclosure include a modified bridge, into which a saddle piece is inserted, that dampens longitudinal waves.

Figures 1A, 1B, 1C:
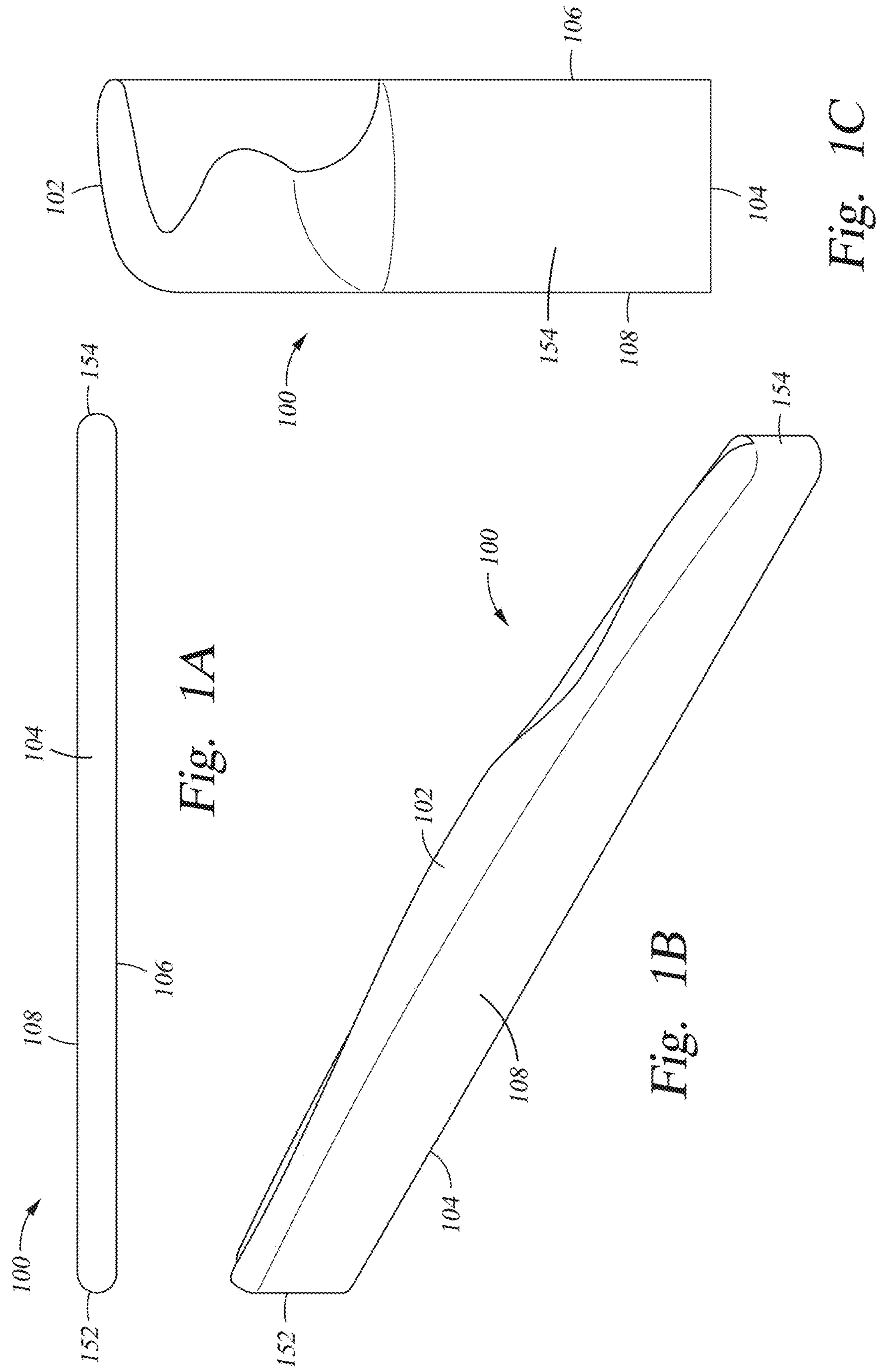
FIG. 1A-1G are various views of a prior art saddle.
Figure 1E:
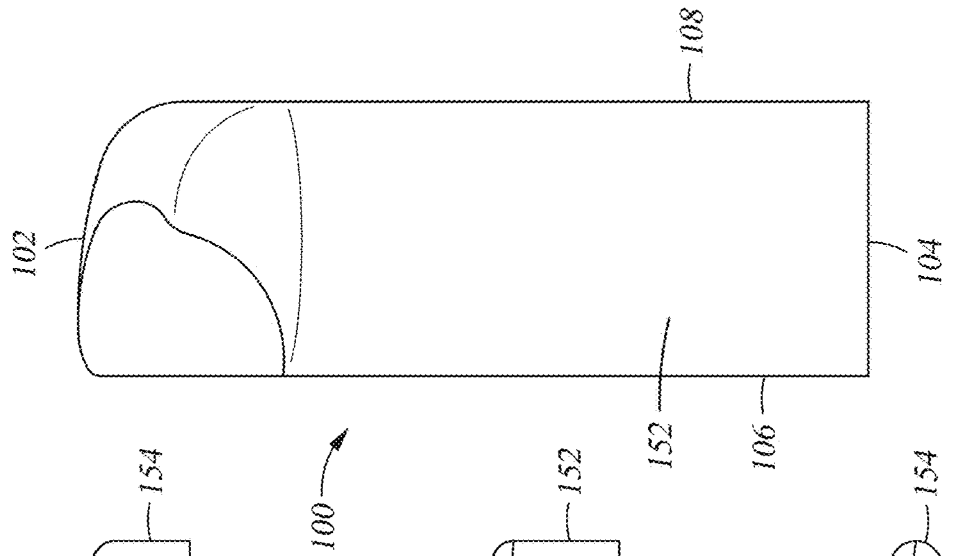
Figure 1D:
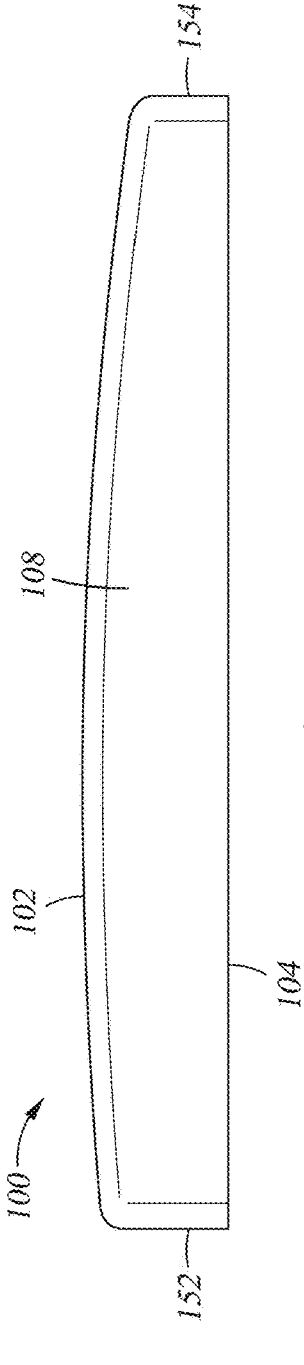
Figure 1F:
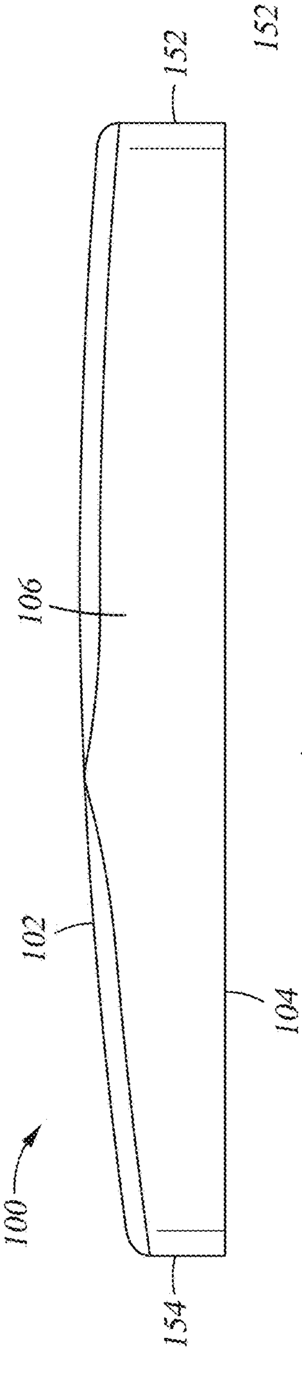
Figure 1G:
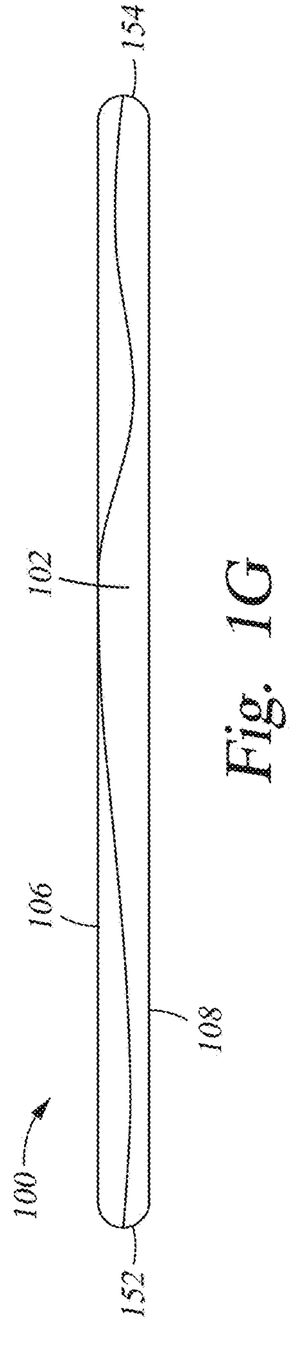

FIGS. 1A-1G depict different views of a prior art saddle 100 for a string instrument. FIG. 1A is a bottom view, FIG. 1B is an isometric view, FIG. 1C is a side view, FIG. 1D is another side view, FIG. 1E is another side view, FIG. 1F is another side view, and FIG. 1G is a top view of saddle 100.

As shown, saddle 100 includes a string contact surface 102 on which strings typically rest. Saddle 100 also includes a saddle end surface 104 which generally contacts the bottom of the slot on the bridge into which saddle 100 is inserted. Saddle 100 also includes two opposing side surfaces 106 and 108, which generally contact side walls of the slot on the bridge into which saddle 100 is inserted. Saddle 100 also includes two additional side surfaces 152 and 154, which generally contact additional side walls of the slot of the bridge into which saddle 100 is inserted.

Saddle 100 is typically made of a hard material such as natural bone, ivory, or a dense synthetic material, and is fit tightly into the slot of a bridge. Vibration of the strings of a string instrument is typically transferred to the body of the instrument through the bridge via saddle 100 in order to amplify the vibration of the strings and make the vibration audible. However, with prior art saddle 100, the undesirable longitudinal wave is transferred along with the desirable transverse wave to the body of the instrument.

Figures 2A, 2B, 2C:
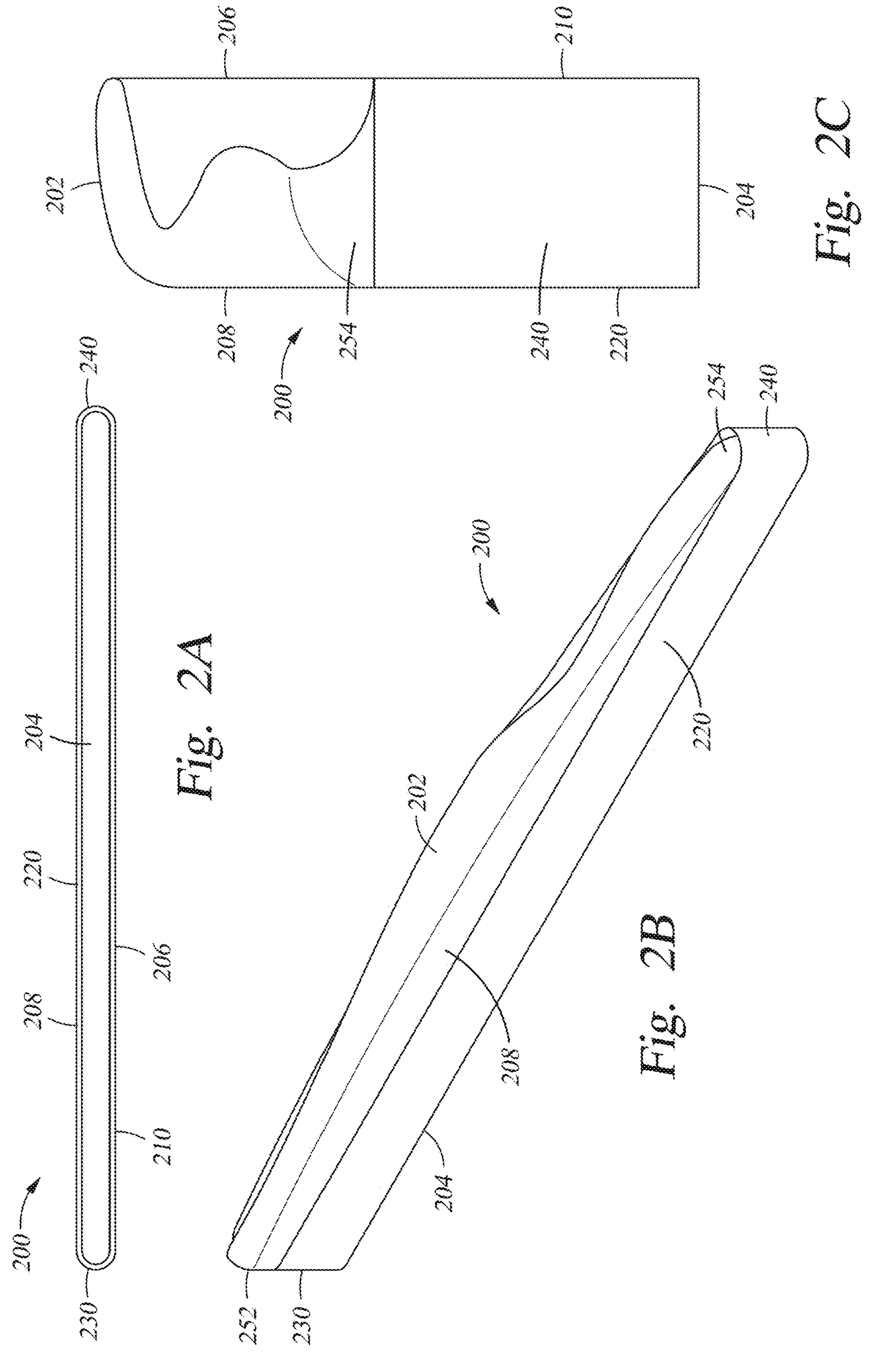
FIGS. 2A-2G are various views of a saddle according to embodiments of the present disclosure.
Figures 2D, 2E, 2F, 2G:
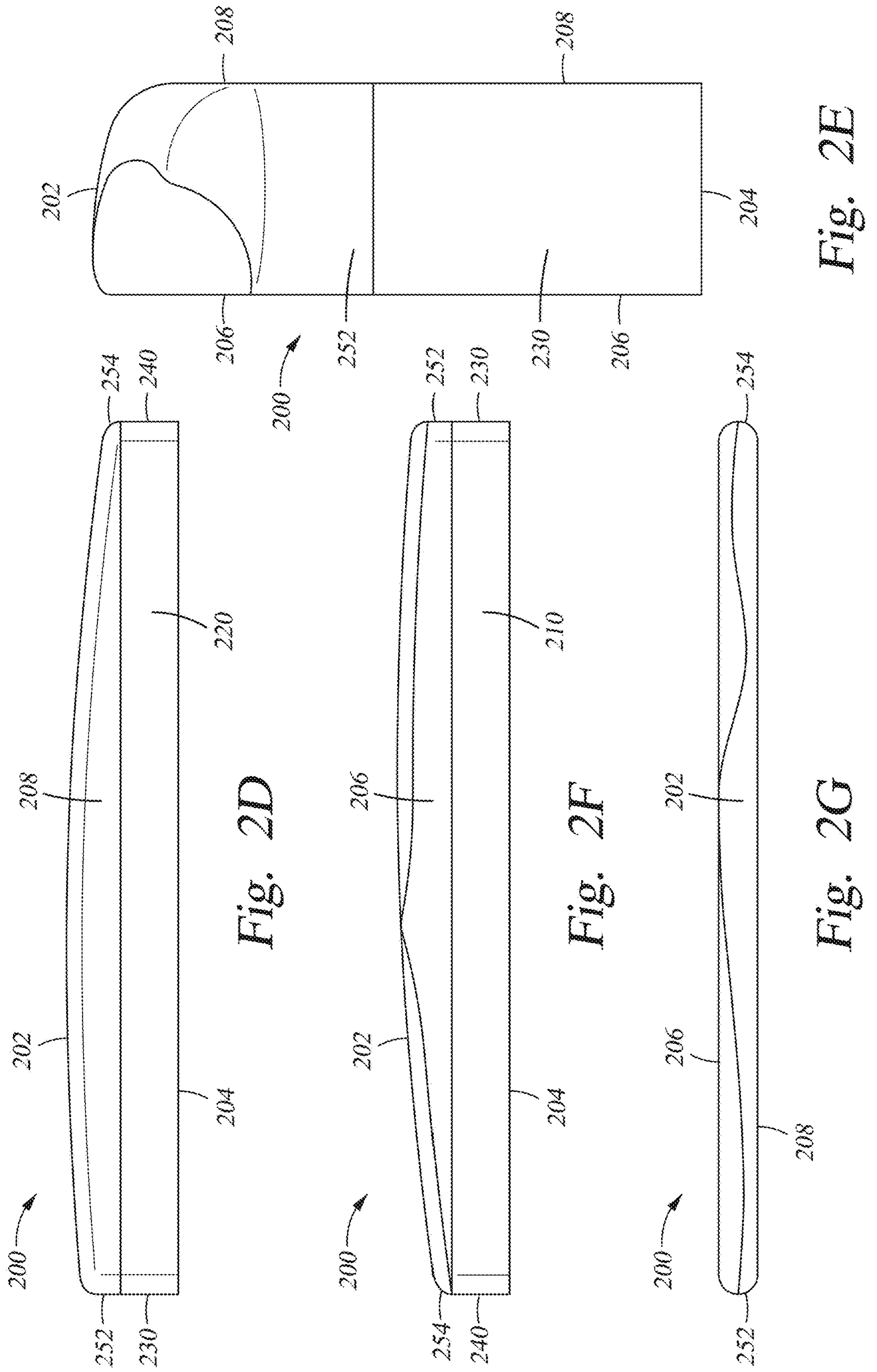

FIGS. 2A-2G illustrate various views of a saddle 200 for reducing longitudinal waves in a string instrument according to embodiments of the present disclosure. FIG. 2A is a bottom view, FIG. 2B is an isometric view, FIG. 2C is a side view, FIG. 2D is another side view, FIG. 2E is another side view, FIG. 2F is another side view, and FIG. 2G is a top view of saddle 200.

Similarly to saddle 100 of FIG. 1, saddle 200 includes a string contact surface 202 on which strings typically rest. Saddle 200 also includes a saddle end surface 204 which generally contacts the bottom of the slot on the bridge into which saddle 200 is inserted. Saddle 200 also includes two opposing side surfaces 206 and 208, which generally contact side walls of the slot on the bridge into which saddle 200 is inserted. Saddle 200 also includes two additional side surfaces 252 and 254, which generally contact additional side walls of the slot of the bridge into which saddle 200 is inserted Saddle 200 serves as an end stop for the active speaking length of the strings of a string instrument.

Like saddle 100, saddle 200 is generally made out of a hard, dense material such as natural bone, ivory, or a dense synthetic material. Unlike saddle 100, however, saddle 200 has been modified to include a vibration-absorbent material in portions 210, 220, 230, and 240 of its side surfaces 206, 208, 252, and 254. As used herein, a vibration-absorbent material may comprise rubber, silicone, foam, plastic, or another type of vibration-absorbent material. More generally, the vibration-absorbent material has a lower density than the material from which the rest of saddle 200 is made.

The vibration-absorbent material may be added to saddle 200 in a variety of ways. In some embodiments, portions 210, 220, 230, and 240 of respective surfaces 206, 208, 252, and 254 have been cut or milled away where they would come in contact with the side wall of the saddle slot, and have been filled in or over molded with the vibration-absorbent material. The outer surface of the vibration-absorbent material in portions 210, 220, 230, and 240 is generally flush with the outer surface of the hard material of the rest of side surfaces 206, 208, 252, and 254 of saddle 200. In alternative embodiments, the vibration-absorbent material may be overlaid onto portions 210, 220, 230, and 240 without cutting or milling away any of the original hard material of saddle 200. In some embodiments, the vibration-absorbent material extends continuously around the perimeter of saddle 200 to cover portions 206, 208, 252, and 254.

When saddle 200 is inserted into the slot of a bridge of a string instrument, the vibration-absorbent material in portions 220 serves to dampen longitudinal waves produced by strings while allowing transverse waves to transfer to the body of the string instrument via saddle end surface 204, which does not include the vibration-absorbent material.

Figure 3A:
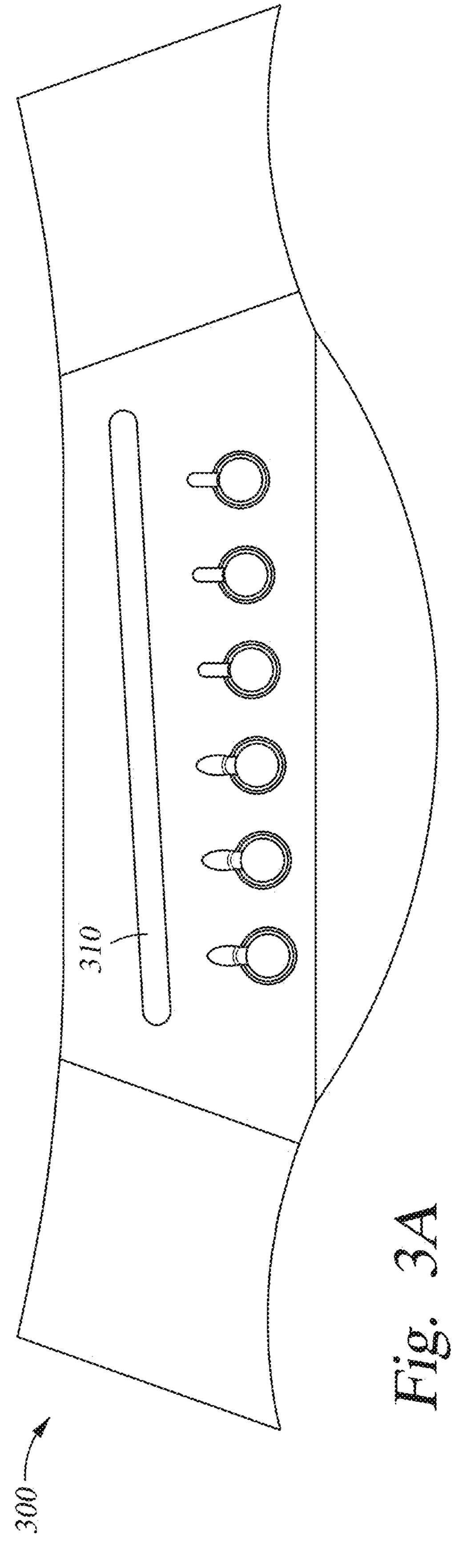
FIG. 3A illustrates a bridge in which embodiments of the present disclosure may be implemented.

FIG. 3A depicts a bridge 300 of a string instrument. Bridge 300 is generally made out of a hard wood, though may alternatively be made out of other materials that vibrate sympathetically with strings, such as metal or plastic.

Bridge 300 has a slot 310 that is designed for a saddle. A saddle is typically fit tightly into slot 310 so that vibrations from strings are transferred from the saddle to bridge 300. Bridge 300 is generally attached to a string instrument, and vibrations are transferred from bridge 300 to the body of the string instrument. In some embodiments, as described below with respect to FIGS. 5A and 5B, bridge 300 may be equipped with a pickup.

Figure 3B:
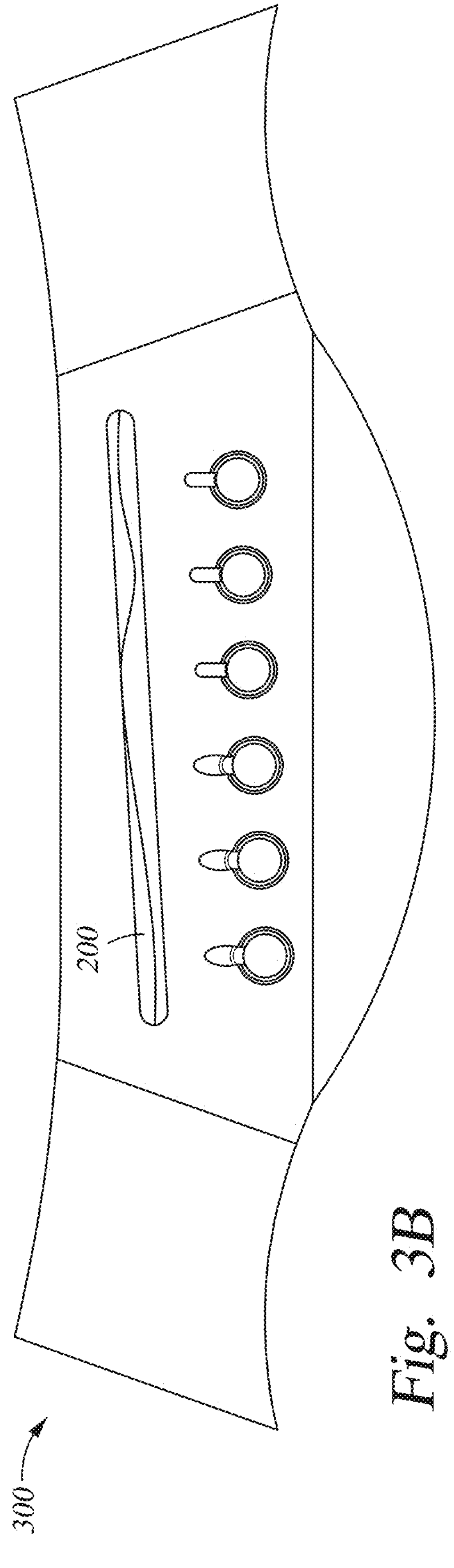
FIG. 3B illustrates a saddle according to embodiments of the present disclosure disposed within a bridge.

FIG. 3B illustrates a saddle 200 according to embodiments of the present disclosure disposed within a bridge 300. For example, saddle 200 may be saddle 200 of FIG. 2, and bridge 300 may be bridge 300 of FIG. 3A.

Saddle 200 is fit tightly into slot 310 of bridge 300. The bottom surface or saddle end surface 204 of FIG. 2A of saddle 200 rests on a floor of slot 310, and does not include the vibration-absorbent material, thereby maintaining direct contact between the dense saddle material and the hard surface of the bridge. Portions 210, 220, 230, and 240 of FIGS. 2B, 2C, 2D, 2E, and 2F of saddle 200 are in contact with side walls of slot 310. In certain embodiments, saddle 200 is fit within slot 310 such that portions 210, 220, 230, and 240 of FIGS. 2A, 2B, 2E, and 2F extend at least a small amount above the top edge of slot 310. As such, the vibration-absorbent material covers all portions of the side surfaces of saddle 200 that contact the side walls of slot 310. String contact surface 202 of FIG. 2C of saddle 200, on which strings of a string instrument generally rest, protrudes upward from slot 310.

With saddle 200 and bridge 300 coupled in this manner, the transverse motion of a string is readily transferred to the top of the string instrument unimpeded via the floor of slot 310. However, the vibration-absorbent material of the side surfaces of saddle 200 serves to absorb and dampen the undesirable longitudinal wave motion, as well as other undesirable high frequency vibration that can interfere with the acoustic sound of the instrument. As such, the use of saddle 200 improves the sound of a string instrument into which it is placed.

In particular embodiments, bridge 300 is equipped with transducers, such as piezoelectric transducers, on the floor of the slot 310. As such, saddle end surface 204 of FIG. 2A of saddle 200 may rest on top of the transducers. In these embodiments, the vibration-absorbent material of the side surfaces of saddle 200 serves to dampen undesirable high frequency vibration such as longitudinal wave motion, while allowing desirable vibration, such as the transverse motion of the string, to transfer to the transducers via saddle end surface 204 of FIG. 2A.

Figure 4C:
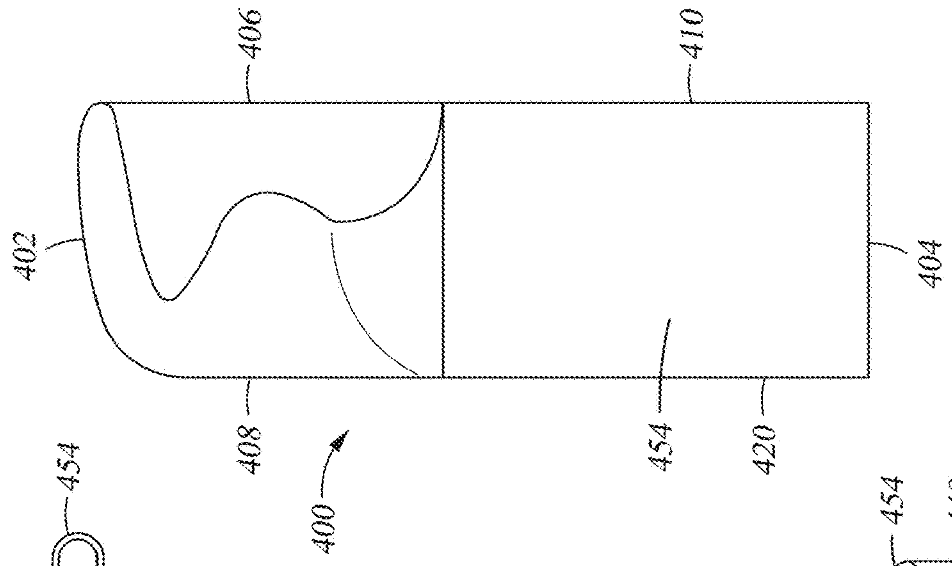
FIGS. 4A-4G are various views of a saddle according to alternative embodiments of the present disclosure.
Figure 4A:
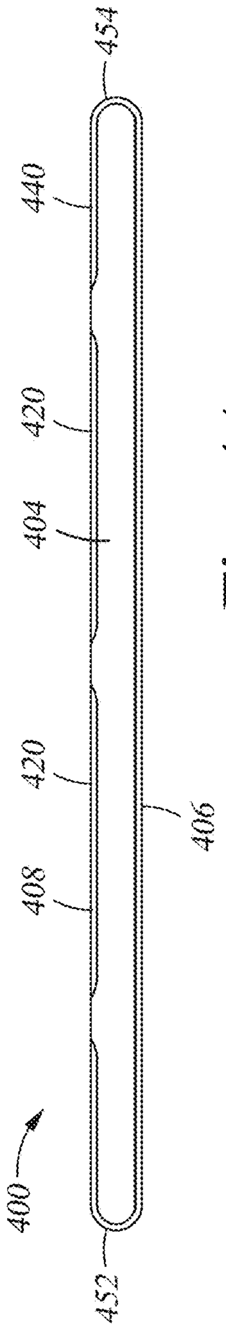
Figure 4B:
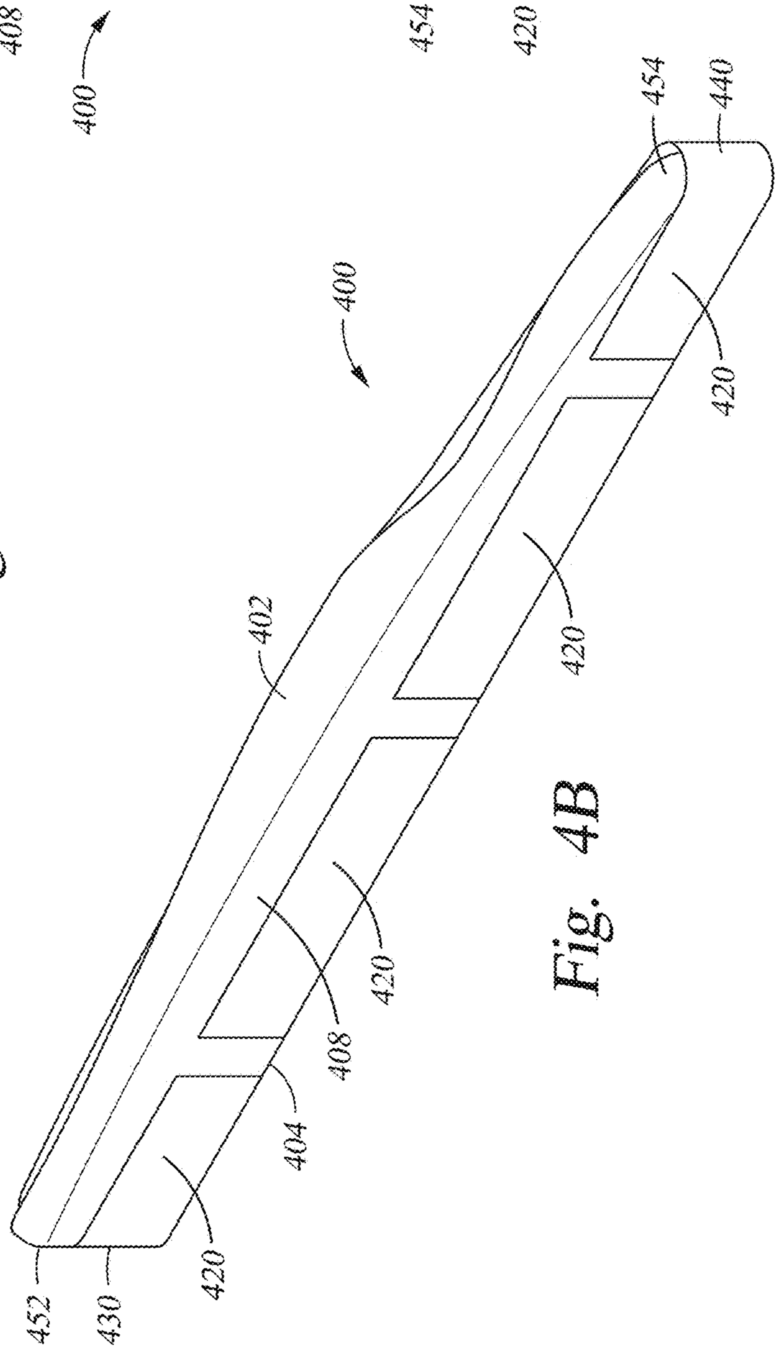
Figure 4E:
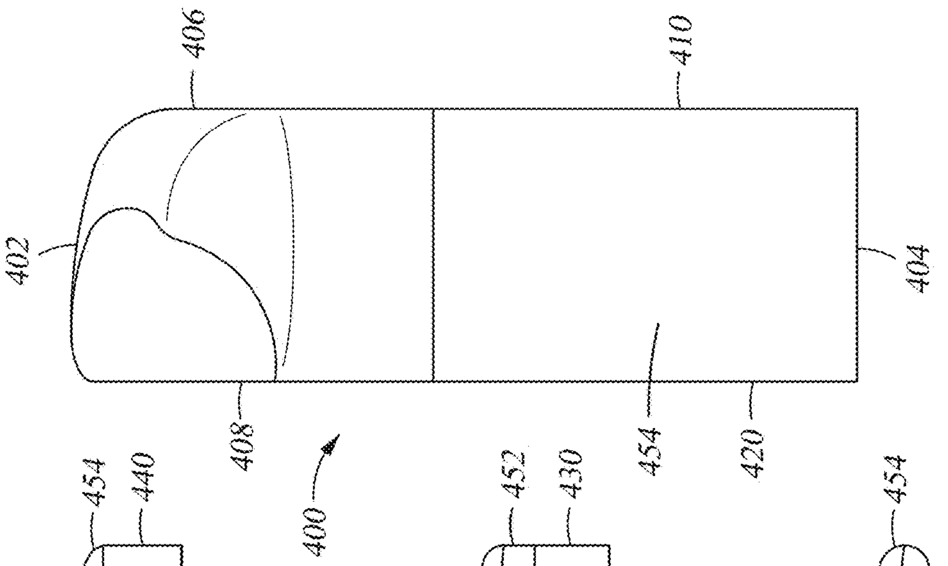
Figure 4D:
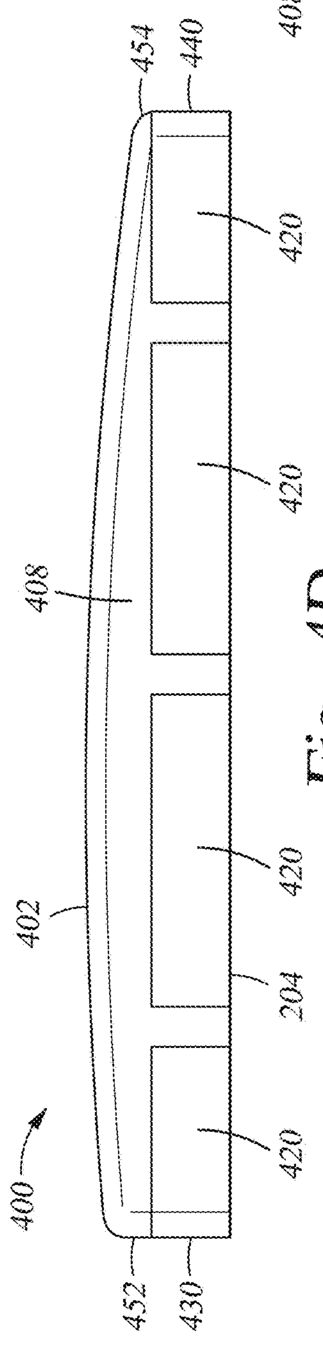
Figure 4F:
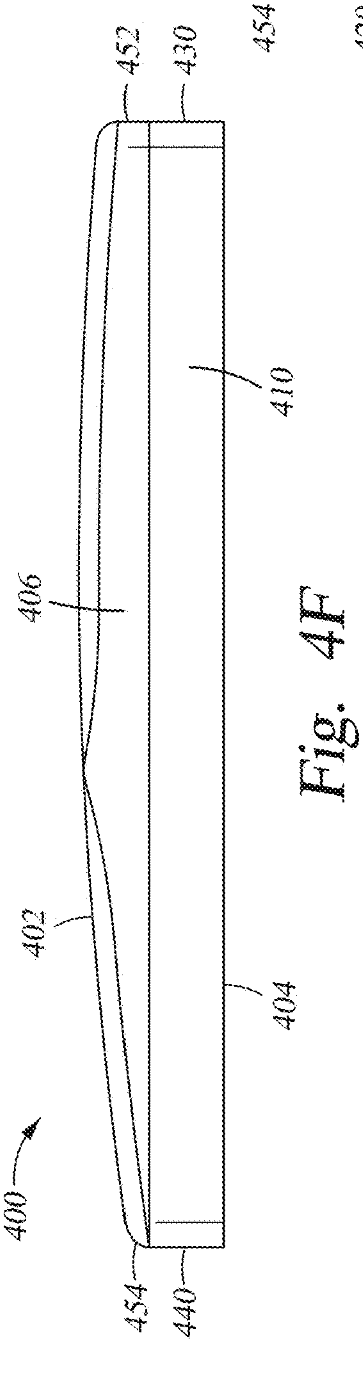
Figure 4G:
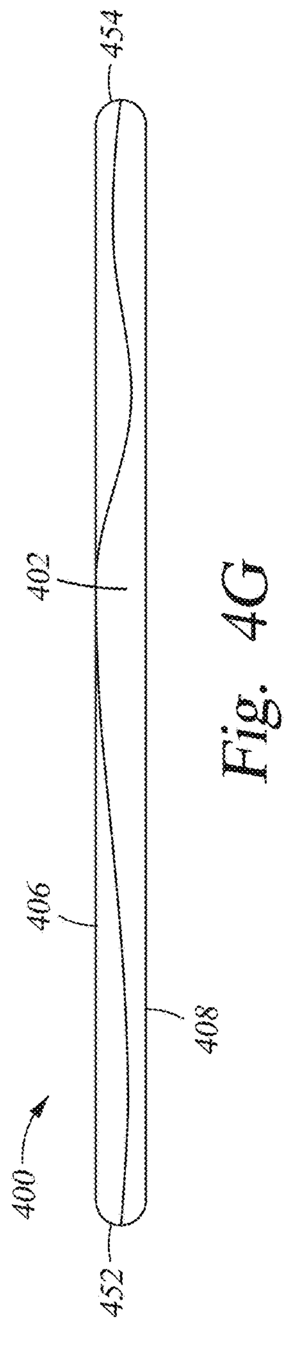

FIGS. 4A-4G illustrate various views of another saddle 400 for reducing longitudinal waves in a string instrument according to embodiments of the present disclosure. FIG. 4A is a bottom view, FIG. 4B is an isometric view, FIG. 4C is a side view, FIG. 4D is another side view, FIG. 4E is another side view, FIG. 4F is another side view, and FIG. 4G is a top view of saddle 400.

Similarly to saddle 200 of FIGS. 2A-2F, saddle 400 includes a string contact surface 402 on which strings typically rest. Saddle 400 also includes a saddle end surface 404 which generally contacts the bottom of the slot on the bridge into which saddle 400 is inserted. Saddle 400 also includes two opposing side surfaces 406 and 408, which generally contact side walls of the slot on the bridge into which saddle 400 is inserted. Saddle 400 also includes two additional side surfaces 452 and 454, which generally contact additional side walls of the slot of the bridge into which saddle 400 is inserted.

Like saddle 200, saddle 400 is generally made out of a hard, dense material that has been modified to include a vibration-absorbent material in portions 410, 420, 430, and 440 of its side surfaces 406, 408, 452, and 454. Unlike saddle 200, however, portion 420 of saddle 400 does not extend across the entire length of side surface 408. Rather, portion 420 is interrupted by sections of the original hard material of side surface 408 that have not been modified to include the vibration-absorbent material. In particular, portion 420 is interrupted by three sections of side surface 408 that do not include the vibration-absorbent material. This configuration of side surface 408 is designed to accommodate a pickup. For example, side surface 408 may face the pins that attach strings to a bridge, and the bridge may be equipped with an electromechanical pickup with three sensors, such as piezo crystals. The sensors may contact the sections of side surface 408 that do not include the vibration-absorbent material such that the transverse motion of the strings is transferred to the sensors unimpeded, as described in more detail below with respect to FIGS. 5A and 5B.

Figure 5A:
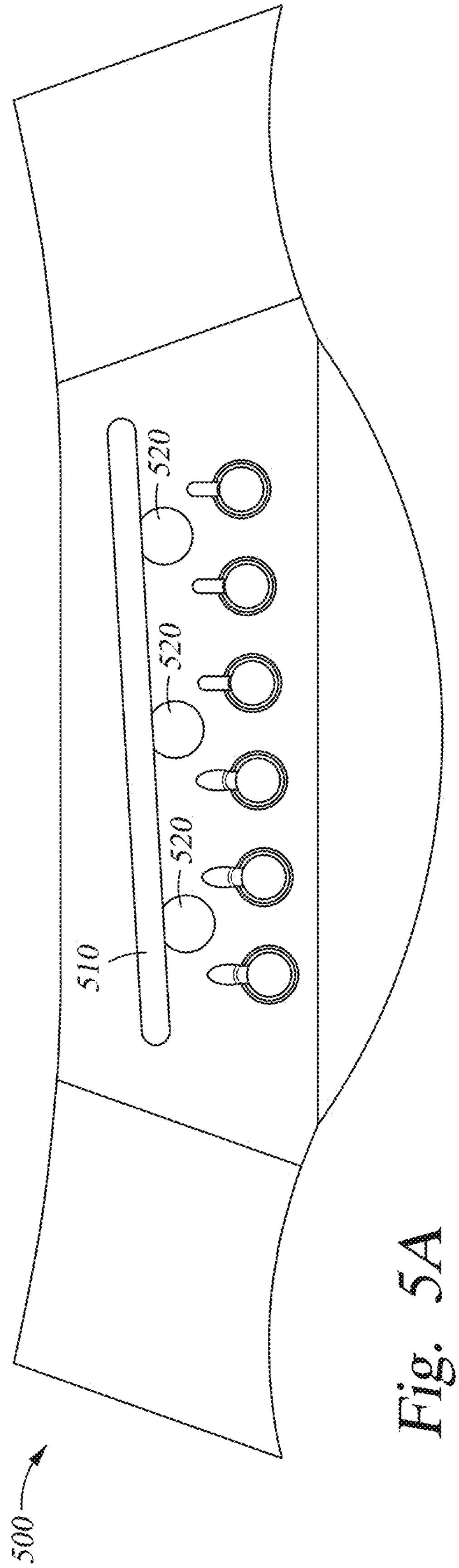
FIG. 5A illustrates a bridge associated with a pickup system in which embodiments of the present disclosure may be implemented.

FIG. 5A depicts a bridge 500 of a string instrument. Like bridge 300 of FIGS. 3A and 3B, bridge 500 is generally made out of a hard wood, though may alternatively be made out of other materials that vibrate sympathetically with strings, such as metal or plastic, or other materials that allow string vibration to transfer through to the body of the guitar.

Bridge 500 has a slot 510 that is designed for a saddle. Bridge 500 is generally attached to a string instrument, and vibrations are transferred from bridge 500 to the body of the string instrument. Bridge 500 also includes an electromechanical pickup with three sensors 520. Sensors 520 may be transducers, such as piezoelectric transducers. For example, sensors 520 may be part of a pickup assembly for receiving vibrations and converting them to electric signals in order to amplify or record the sound made by strings. In some embodiments, a vibration-absorbent material is included behind sensors 520 in bridge 500.

Figure 5B:
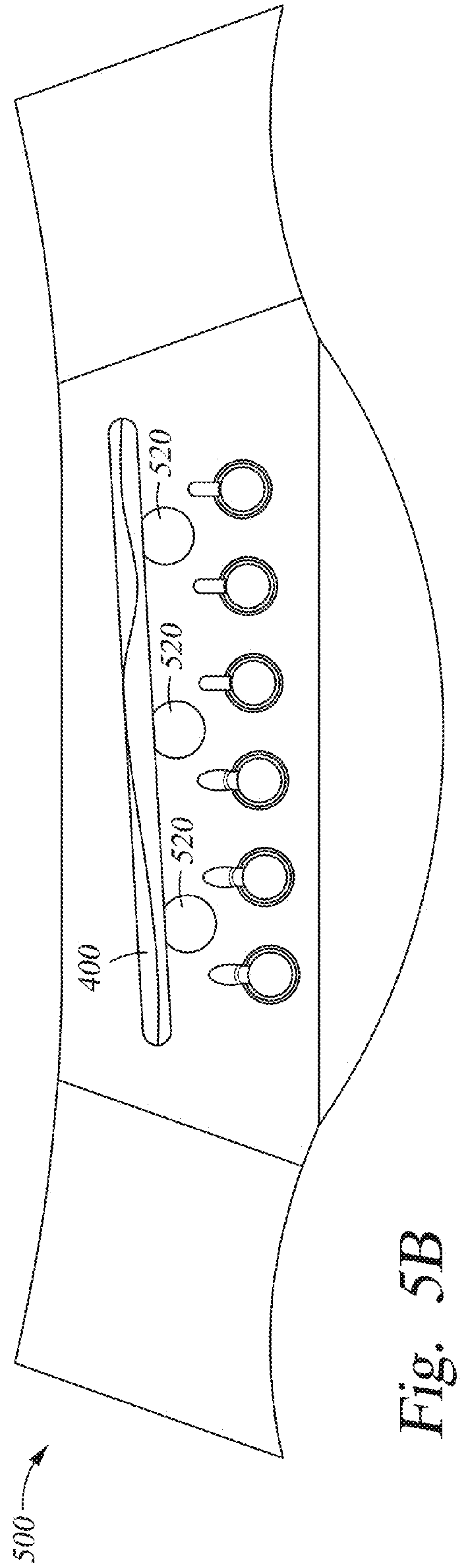
FIG. 5B illustrates a saddle according to embodiments of the present disclosure disposed within a bridge associated with a pickup system.

FIG. 5B illustrates a saddle 400 according to embodiments of the present disclosure disposed within a bridge 500. For example, saddle 400 may be saddle 400 of FIG. 4, and bridge 500 may be bridge 500 of FIG. 5A.

Saddle 400 is fit tightly into slot 510 of bridge 500. The bottom surface or saddle end surface 404 of FIG. 4D of saddle 400 rests on a floor of slot 510, and does not include the vibration-absorbent material, thereby maintaining direct contact between the dense saddle material and the hard surface of the bridge. Portions 410, 420, 430, and 440 of FIGS. 4B, 4C, 4D, 4E, and 4F of saddle 400 are in contact with side walls of slot 510. In certain embodiments, saddle 400 is fit within slot 510 such that portions 410, 420, 430, and 440 of FIGS. 4B, 4C, 4D, 4E, and 4F extend at least a small amount above the top edge of slot 510. As such, the vibration-absorbent material covers all portions of the side surfaces of saddle 400 that contact the side walls of slot 510.

Side surface 408 of FIG. 4B of saddle 400 is positioned so that the sections that do not include the vibration-absorbent material, the sections that interrupt portion 420, are in contact with sensors 520. As such, the hard surface of saddle 400 is placed in contact with sensors 520 in order to transfer the transverse waves from the strings to sensors 520, while the rest of the side surfaces of saddle 400 that contact the side walls of slot 510 are covered in the vibration-absorbent material in order to dampen the longitudinal waves.

String contact surface 402 of FIG. 4C of saddle 400, on which strings of a string instrument generally rest, protrudes upward from slot 410.

With saddle 200 and bridge 300 coupled in this manner, the transverse motion of a string is readily transferred to the top of the string instrument unimpeded via the floor of slot 310 and to sensors 520 via the sections of side surface 408 that do not include the vibration-absorbent material. However, the vibration-absorbent material of portions 410, 420, 430, and 440 of FIGS. 4B, 4C, 4D, 4E, and 4F serves to absorb and dampen the undesirable longitudinal wave motion, which can interfere with the acoustic sound of the instrument, as well as the sound signal when the instrument is fitted with an electromechanical pickup system including sensors 520. As such, the use of saddle 400 improves the sound of a string instrument into which it is placed, both unplugged and through a pickup.

Figure 6:
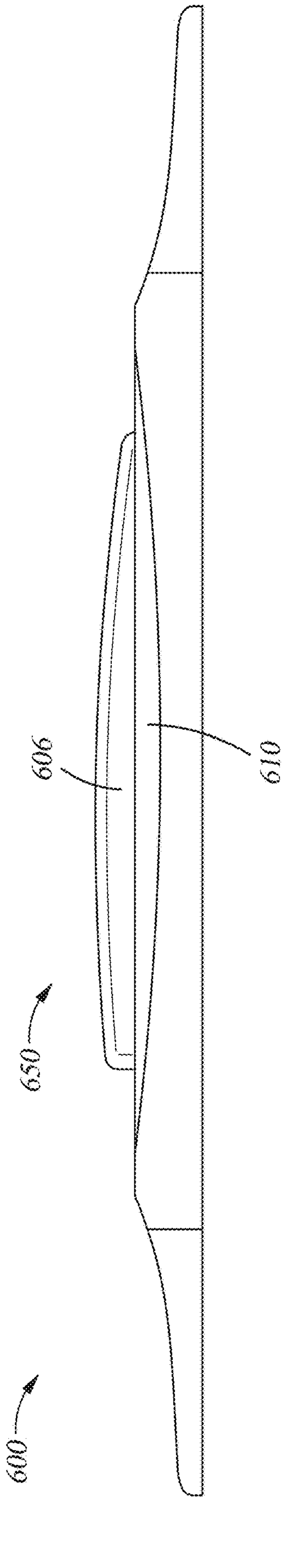
FIG. 6 illustrates a saddle according to embodiments of the present disclosure disposed within a bridge.

FIG. 6 illustrates a saddle 650 according to embodiments of the present disclosure disposed within a slot of a bridge 600. Saddle 650 may be representative of either saddle 200 of FIGS. 2A-2F or saddle 400 of FIGS. 4A-4F. Bridge 600 may be representative of either bridge 300 of FIGS. 3A-3B or bridge 500 of FIGS. 5A-5B.

Saddle 600 has a side surface 608 including a portion 610 that comprises a vibration-absorbent material. As illustrated, portion 610 extends a small amount above the surface of bridge 600, thereby ensuring that no part of saddle 650 not covered in the vibration-absorbent material is in contact with the side walls of the slot in bridge 600 into which saddle 650 is inserted.

Figure 7A:
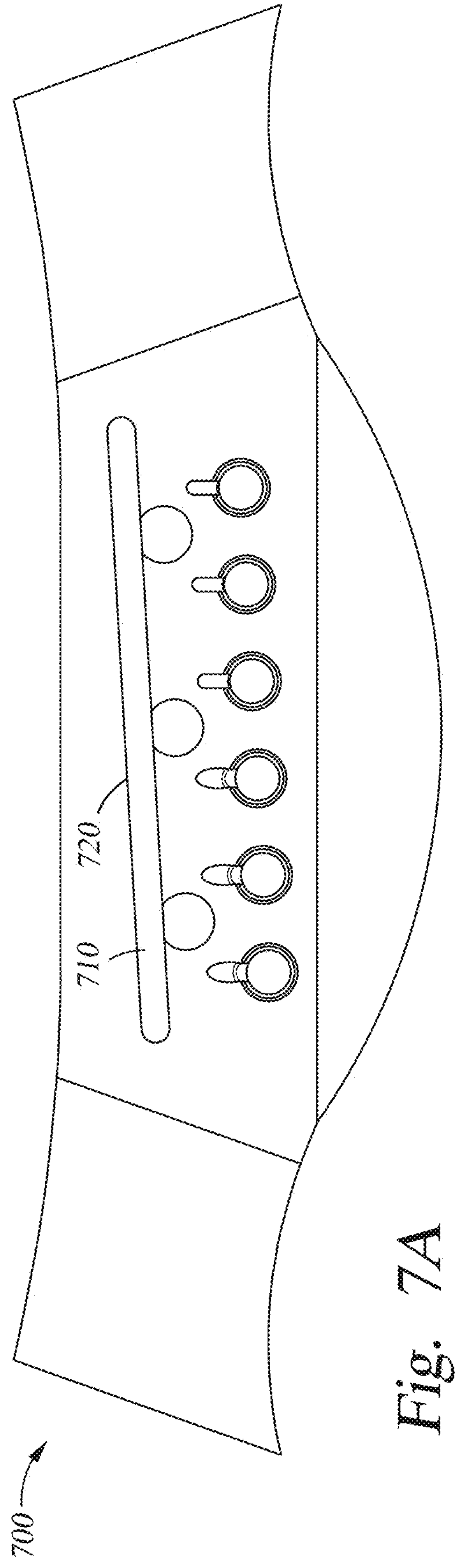
FIG. 7A illustrates a bridge according embodiments of the present disclosure.

FIG. 7A illustrates a bridge 700 according to embodiments of the present disclosure.

Bridge 700 is generally made of a hard material and includes a slot 710, similarly to bridge 300 of FIGS. 3A-3B and bridge 500 of FIGS. 5A-5B. However, on bridge 700, the side walls 720 of slot 710 are covered in a vibration-absorbent material. For example, the hard material on the side walls 720 of slot 710 may have been cut or milled down and filled in or over molded with the vibration-absorbent material. When a saddle is inserted tightly into slot 710 of bridge 700, the vibration-absorbent material on the side walls 720 of slot 710 serves to dampen the longitudinal waves produced by strings resting on the saddle, while still allowing the transverse waves to transfer to the body of the instrument via a floor of slot 710. In alternative embodiments, the vibration-absorbent material may be added to side walls 720 without cutting or milling any portion of side walls 720. In these embodiments, a smaller saddle may be inserted into slot 710.

Furthermore, in some embodiments, bridge 700 includes a pickup system comprising sensors, such as piezoelectric transducers. As such, the vibration-absorbent material may only cover the portions of side walls 710 that do not include sensors.

Figure 7B:
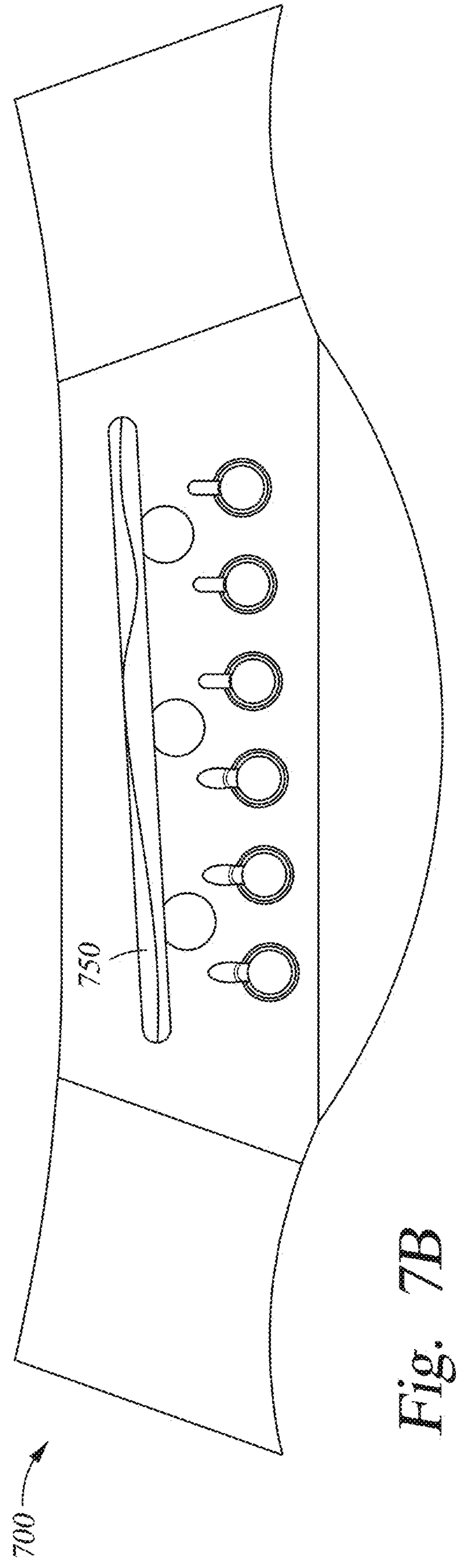
FIG. 7B illustrates a saddle disposed within a bridge according to embodiments of the present disclosure.

FIG. 7B illustrates a saddle 750 disposed within a bridge 700 according to embodiments of the present disclosure. For example, saddle 750 may be representative of prior art saddle 100 of FIGS. 1A-1F and saddle 700 may be saddle 700 of FIG. 7A.

Saddle 750 is fit tightly into slot 710 of bridge 700. The side surfaces of saddle 700 contact the vibration-absorbent material on side walls 720 of slot 710.

With saddle 750 and bridge 700 coupled in this manner, the transverse motion of a string is readily transferred to the top of the string instrument unimpeded via the floor of slot 710 (and, in some embodiments, to sensors of a pickup system). However, the vibration-absorbent material of side walls 720 serves to absorb and dampen the undesirable longitudinal wave motion, which can interfere with the acoustic sound of the instrument, as well as the sound signal when the instrument is fitted with an electromechanical pickup system. As such, the use of bridge 700 improves the sound of a string instrument into which it is placed, both unplugged and through a pickup.

Figure 8:
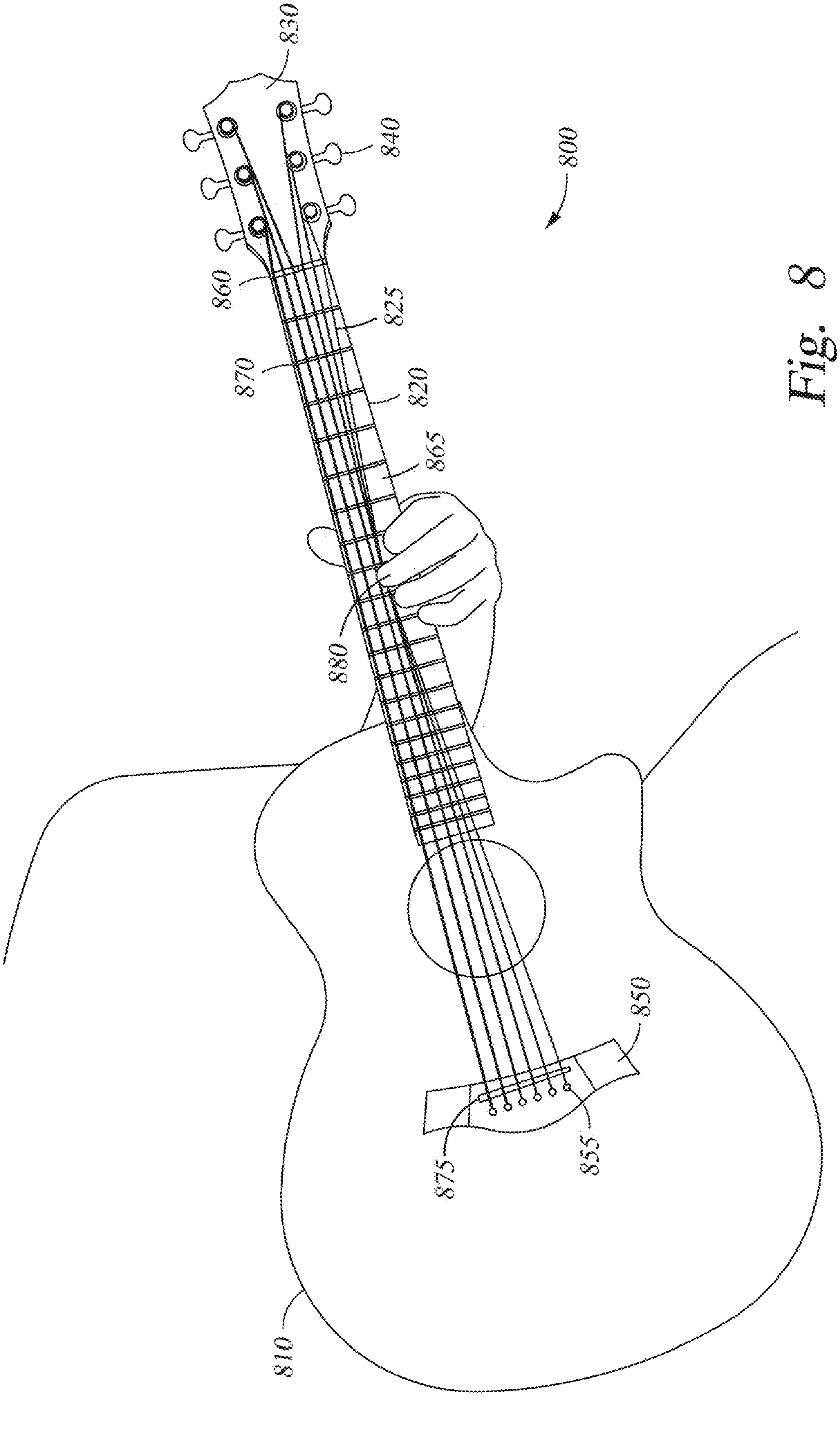
FIG. 8 illustrates a guitar in which embodiments of the present disclosure may be implemented.

FIG. 8 depicts a guitar 800 with which embodiments of the present disclosure may be implemented.

In the example of FIG. 8, the guitar is an acoustic guitar wherein the top of the guitar acts as an acoustic soundboard, but elements of the present invention are equally useful when applied to an electric guitar or any other string instrument. The guitar includes a body 810, a neck 820, and a headstock 830. Strings, including string 825, extend from the headstock where they are tightened to a preferred tension with keys 840 to a bridge 850 (e.g., bridge 300 of FIGS. 3A-3B, bridge 500 of FIGS. 5A-5B, or bridge 700 of FIGS. 7A-7B) where they are anchored with bridge pins 855, one for each string. A nut 860 is placed at the end of a fingerboard 865 adjacent the headstock and controls the string spacing, distance from the edge of the fingerboard and the height of the strings above a first fret 870 on the fingerboard 865. The strings are slightly splayed over their length and extend over a saddle 875 that is housed in the bridge 850. Saddle 875 may be saddle 100 of FIGS. 1A-1F, saddle 200 of FIGS. 2A-2F, or saddle 400 of FIGS. 4A-4F. The portion of the strings that vibrates to create a sound when plucked is that portion extending between the nut 860 and saddle 875. The strings are stopped or effectively shortened when they are depressed behind a fret.

It is noted that, while certain embodiments are described with respect to guitars, techniques presented herein may also be employed with other types of string instruments. While the foregoing is directed to embodiments of the present disclosure, other and further embodiments of the disclosure may be devised without departing from the basic scope thereof, and the scope thereof is determined by the claims that follow.

The invention claimed is:

1. A saddle for a string instrument, comprising:
a string contact surface comprising a first material;
a saddle end surface, generally opposite the string contact surface, comprising the first material; and
two opposing side surfaces comprising a vibration-absorbent material different than the first material, wherein the vibration-absorbent material is disposed within a depression in the first material on an outer portion of at least one side surface of the two opposing side surfaces such that the vibration-absorbent material does not extend beyond the saddle end surface.

2. The saddle of claim 1, wherein a first side surface of the two opposing side surfaces comprises:
at least a first section comprising the first material; and
a plurality of second sections comprising the vibration-absorbent material.

3. The saddle of claim 2, wherein two second sections of the plurality of second sections are separated by the first section.

4. The saddle of claim 2, wherein the first side surface is a pin side of the saddle.

5. The saddle of claim 1, wherein an outer surface of the vibration-absorbent material is generally flush, on the outer portion of the least one side surface, with an outer surface of the first material.

6. The saddle of claim 1, wherein the vibration-absorbent material is selected from the following list: rubber; silicon; plastic; or foam.

7. The saddle of claim 1, wherein the vibration-absorbent material has a lower density than the first material.

8. The saddle of claim 1, further comprising two additional opposing side surfaces, generally perpendicular to the two opposing side surfaces, comprising the vibration-absorbent material.

9. The saddle of claim 8, wherein the vibration-absorbent material extends continuously around the two opposing side surfaces and the two additional opposing side surfaces.

10. A guitar, comprising:
- a neck;
- a body;
- a top;
- a bridge affixed to the top, the bridge comprising a slot, the slot having a slot end surface and two side walls; and
- a saddle at least partially disposed within the slot, the saddle having:
  - a string contact surface comprising a first material;
  - a saddle end surface, generally opposite the string contact surface, comprising the first material; and
  - two opposing side surfaces comprising a vibration-absorbent material, wherein the vibration-absorbent material is disposed within a depression in the first material on an outer portion of at least one side surface of the two opposing side surfaces such that the vibration-absorbent material does not extend beyond the saddle end surface.

11. The guitar of claim 10, further comprising at least a first transducer located on a side wall of the slot, the first transducer having a transducer contact surface in contact with a section of a side surface of the two opposing side surfaces of the saddle, wherein the section of the side surface comprises a material other than the vibration-absorbent material.

12. The guitar of claim 10, wherein a first side surface of the two opposing side surfaces comprises:
- at least a first section comprising the first material; and
- a plurality of second sections comprising the vibration-absorbent material.

13. The guitar of claim 12, wherein two second sections of the plurality of second sections are separated by the first section.

14. The guitar of claim 12, wherein the first side surface is a pin side of the saddle.

15. The guitar of claim 10, wherein an outer surface of the vibration-absorbent material is generally flush, on the outer portion of the at least one side surface, with an outer surface of the first material.

16. The guitar of claim 10, wherein the vibration-absorbent material is selected from the following list: rubber; silicon; plastic; or foam.

17. The guitar of claim 10, wherein the vibration-absorbent material has a lower density than the first material.

18. A bridge comprising a slot, the slot comprising:
- a slot end surface comprising a first material; and
- two side walls, wherein the two side walls comprise a vibration-absorbent material different than the first material, wherein the vibration-absorbent material is disposed within a depression in the first material on at least one side wall of the two side walls, wherein a saddle is at least partially disposed within the slot, the saddle having a string contact surface, a saddle end surface generally opposite the string contact surface, and two opposing side surfaces in contact with the two side walls, and wherein the vibration-absorbent material does not extend beyond the saddle end surface.

19. The bridge of claim 18, wherein the vibration-absorbent material is selected from the following list: rubber; silicon; plastic; or foam.

20. The bridge of claim 18, wherein the vibration-absorbent material has a lower density than the first material.

* * * * *